Oct. 5, 1943.     J. S. PARSONS     2,331,223
ELECTRICAL DISTRIBUTION SYSTEM
Filed Aug. 3, 1940     6 Sheets-Sheet 1

INVENTOR
John S. Parsons.

Oct. 5, 1943.   J. S. PARSONS   2,331,223
ELECTRICAL DISTRIBUTION SYSTEM
Filed Aug. 3, 1940   6 Sheets-Sheet 4

WITNESSES:

INVENTOR
John S. Parsons.
BY
ATTORNEY

Oct. 5, 1943.   J. S. PARSONS   2,331,223
ELECTRICAL DISTRIBUTION SYSTEM
Filed Aug. 3, 1940   6 Sheets-Sheet 5

WITNESSES:
James F. Young
C. L. Freedman

INVENTOR
John S. Parsons.
BY
ATTORNEY

Patented Oct. 5, 1943

2,331,223

UNITED STATES PATENT OFFICE 2,331,223

ELECTRICAL DISTRIBUTION SYSTEM

John S. Parsons, Swissvale, Pa., assignor to Westinghouse Electric & Manufacturing Company, East Pittsburgh, Pa., a corporation of Pennsylvania Application August 3, 1940, Serial No. 350,385

22 Claims. (Cl. 175—294)

This invention relates to electrical distribution systems, and it has particular relation to electrical distribution systems of the network type.

In areas requiring electrical service of good continuity and high density, such as areas occurring in large cities, it has become standard practice to employ distribution systems of the secondary network type. Such a system includes a plurality of substantially independent feeder circuits which are coupled to a common secondary network or grid circuit. Each of the feeder circuits is coupled to the secondary network circuit through a plurality of network transformers, each provided with a network protector. Under normal conditions of operation, all feeder circuits supply electrical energy to the secondary network circuit.

Should a fault occur on one of the feeder circuits, current flows from the secondary network circuit to the fault through the network transformers and protectors associated with the faulty feeder circuit. Because of the reversal in energy flow, directional relays associated with the protectors trip to disconnect the faulty feeder circuit from the secondary network circuit. Also the feeder circuit breaker associated with the faulty feeder circuit opens under the control of its customary relays to disconnect the faulty feeder circuit from its supply source and remove it from service. The secondary network circuit, however, continues to receive electrical energy over the remaining sound feeder circuits with no interruption of service.

When a fault occurs on the secondary network circuit or grid, the network protectors all remain closed and the fault is burned off. Because of the large currents and electrical energy available from the several feeder circuits, it is entirely practicable to burn off secondary network circuit faults.

Because of the excellent continuity and reliability of service afforded by network distribution circuits, there has been a pronounced trend extending such network circuits to higher voltage fields. For example, network distribution circuits for distributing service at a phase-to-phase voltage of 2300 volts or 4000 volts, are not uncommon. These higher voltages, however, require some modification in the network circuits employed. Network circuits designed for such high voltages commonly are designated as primary network circuits.

Because of the higher voltages which tend to sustain faults and because of the increased damage resulting from a fault occurring on high voltage primary network circuits from a fault of long duration, it is customary to provide such a distribution system with protection not only against feeder circuit faults but against network circuit faults. In a typical primary network system, the feeder circuits are connected to the primary network circuit through network transformers and transformer circuit breakers generally of conventional design. In addition, each network main between adjacent points of connection of the feeder circuits is provided with a pair of sectionalizing switches. These sectionalizing switches have suitable controls for removing faulty network mains from service. Examples of this prior art design may be found in my United States Patents Nos. 1,947,100 and 1,955,311, which are assigned to the Westinghouse Electric & Manufacturing Company.

Although the systems disclosed in my aforesaid patents provide excellent service, their fields of application are restricted because of their cost and complexity. This limitation will be appreciated when it is recalled that each of the network mains requires two sectionalizing switches, together with suitable control equipment.

In accordance with this invention, a simplified primary network distribution system is provided. To this end, a portion of the burden of protecting the system against faults occurring on the network mains is shifted to the transformer circuit breakers associated with the network transformers. By this shift, together with suitable revision of the control equipment, it is possible to restrict the sectionalizing switches to one sectionalizing switch for each network main.

According to a specific embodiment of the invention, the transformer circuit breakers are employed substantially in the conventional manner for protecting the system against faults occurring on the feeder circuits. When a fault occurs on one of the feeder circuits supplying the primary network of this invention, the reversal of energy flow through the transformer circuit breakers associated with the faulty feeder operates to trip these breakers. When the feeder circuit breaker associated with the faulty feeder circuit opens, the faulty feeder circuit is completely removed from service.

When a fault occurs on a network main adjacent a transformer circuit breaker, the excessive current flowing to the fault through the associated transformer trips the breaker. In addition, the excessive current flowing through each of the adjacent sectionalizing switches is employed to first trip these sectionalizing switches, thereby completely removing the faulty section of the primary network circuit from service.

After tripping, the transformer breaker enters a closing cycle. If the fault on the network main clears within the closing cycle, the breaker closes and remains closed. However, if the fault persists, the breaker recloses and trips for a predetermined number of times and then locks out.

If the transformer breaker remains locked out, nothing further happens until the fault is repaired. On the other hand, if the fault clears within the closing cycle of the transformer breaker and the breaker remains closed after one of its reclosures, the adjacent sectionalizing switches also close to restore the isolated section of the primary network circuit to its original condition.

For effecting the desired operations, each sectionalizing switch may be provided with overcurrent tripping means, preferably with inverse time delay. In addition, each sectionalizing switch includes reclosing means effective only when voltage appears on the associated network main on both sides of the sectionalizing section. In many cases it also is desirable to prevent reclosure of the sectionalizing switch when phase conditions across the poles thereof are incorrect.

In a further embodiment of the invention, certain of the sectionalizing switches may be provided with an auxiliary closing control. This auxiliary control is effective for closing a sectionalizing switch a restricted number of times when voltage appears on the associated network main on either side of the switch.

It is, therefore, an object of the invention to provide a simplified primary network distribution system.

It is a further object of the invention to provide a primary network distribution system having only one sectionalizing switch in each network main.

It is a still further object of the invention to provide a primary network distribution system wherein a transformer circuit breaker employed for coupling a feeder circuit to the primary network circuit also is constructed for assisting in the clearance of primary network circuit faults.

It is a further object of the invention to provide a transformer circuit breaker for coupling feeder circuits to a primary network circuit which trips in response to current flowing to a fault occurring on the primary network circuit.

It is a still further object of the invention to provide a transformer circuit breaker for coupling a feeder circuit to a primary network circuit which is designed to reclose a predetermined number of times after a tripping operation thereof.

It is a further object of the invention to provide a sectionalizing switch for a primary network circuit which recloses only when voltage appears in the associated circuit on both sides of the sectionalizing switch.

It is a further object of the invention to provide a sectionalizing switch for a primary network circuit which recloses only when the phase conditions across its poles are correct.

It is another object of the invention to provide a primary network comprising a plurality of substantially independent network loop circuits.

It is a still further object of the invention to provide a sectionalizing switch for a primary network system with closing means effective only when voltage appears in the associated circuit on both sides of the sectionalizing switch and with auxiliary closing means effective for a restricted number of closing operations when voltage appears in the associated circuit on either side of the sectionalizing switch.

Other objects of the invention will be apparent from the following description taken in conjunction with the accompanying drawings, in which.

Figure 1:
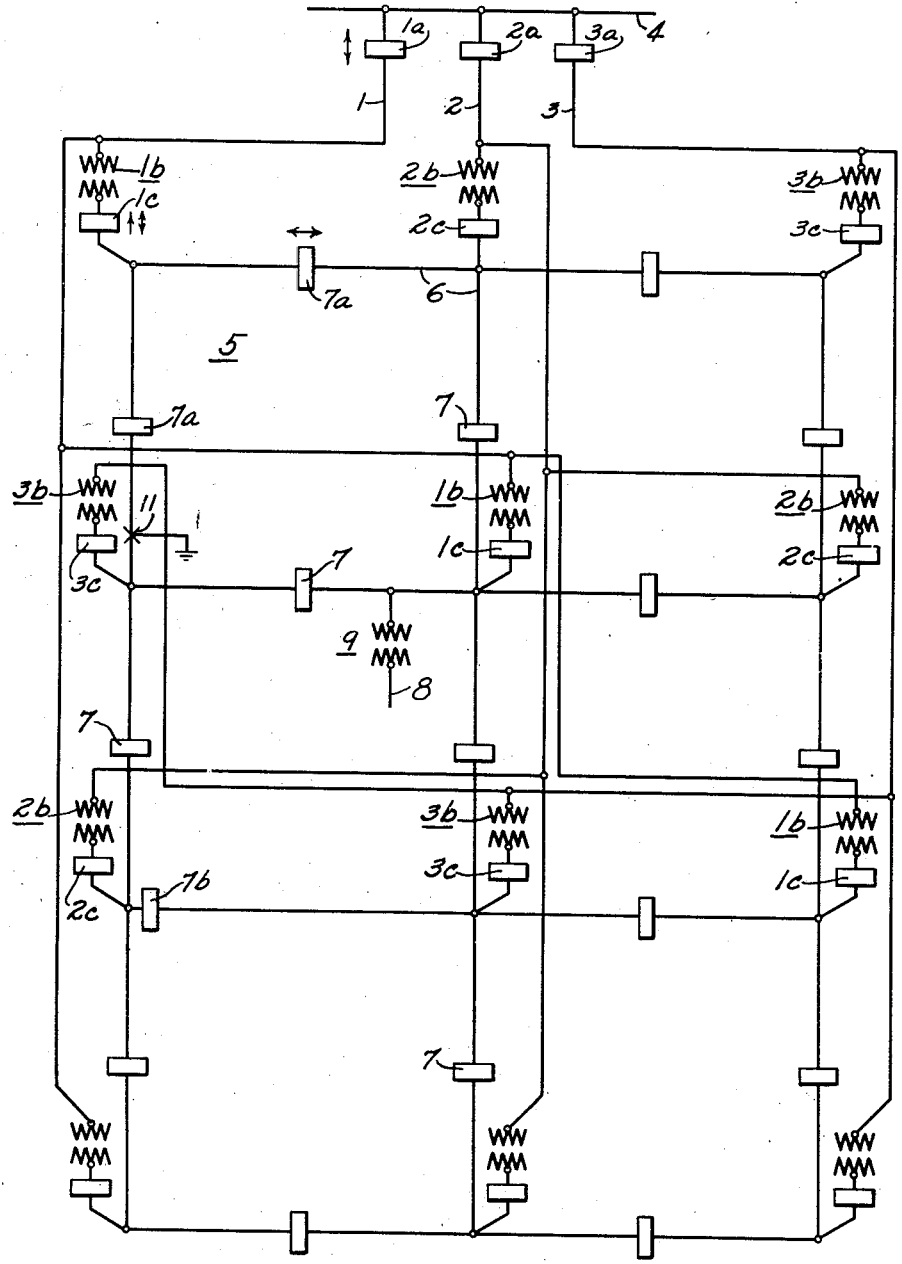
Figure 1 is a diagrammatic view in single line of a primary network distribution system embodying the invention.

Referring to the drawings, Fig. 1 shows a primary network system including three feeder circuits 1, 2 and 3. Although these feeder circuits may be connected to different sources of energy, for the purpose of illustration they are connected to a common source of energy, such as a bus 4 through feeder circuit breakers 1a, 2a and 3a. The feeder circuit breakers may be of conventional design, including overcurrent relays and ground relays for tripping the circuit breakers upon the occurrence of faults on the associated feeder circuits. Preferably the feeder circuit breakers are of the reclosing type which reclose for a predetermined number of times after tripping and then lock out.

The primary feeder circuits are employed for energizing a common primary network distribution circuit or grid 5. To this end the feeder circuit 1 is connected to the network distribution circuit 5 through a plurality of network transformers 1b and network transformer circuit breakers 1c. Similarly, the feeder circuits 2 and 3 are connected to the network distribution circuit 5 through network transformers 2b, 3b and through network transformer circuit breakers 2c and 3c.

As illustrated in Fig. 1, the network distribution circuit or grid 5 includes a plurality of network mains 6 which are interconnected to form a solid network distribution circuit. For protective purposes, each of the network mains 6 is provided with a sectionalizing switch 7, 7a or 7b. These sectionalizing switches all may be of similar construction. However, the reference characters 7a and 7b are employed for designating certain sectionalizing switches for reasons which will be pointed out below.

Preferably, each sectionalizing switch is positioned substantially at the midpoint of its associated network main. This is for the reason that such a position decreases the duty on the sectionalizing switch. Moreover, somewhat improved regulation is obtained by such a positioning of the sectionalizing switches when a section of the network distribution circuit or grid 5 is out of service.

If desired, however, the sectionalizing switches may be positioned adjacent the network protectors or transformer circuit breakers. This is represented in Fig. 1 by the sectionalizing switch 7b which is positioned adjacent one of the network protectors 2c. Such a location for the sectionalizing switch 7b has the advantage that the three adjacent units 2b, 2c and 7b may be installed at a common point. This is particularly desirable for underground constructions because of the resulting reduction in the number of vaults required for receiving the equipment.

It will be understood that service is derived from any of the network mains. For example, a load may be supplied through a circuit 8 which is connected to one of the network mains through a distribution transformer 9.

The ratings for the system illustrated in Fig. 1 may vary appreciably. For example, the feeder circuits 1, 2 and 3 may be three-phase circuits designed to operate at 33 kilovolts, phase to phase. The network transformers 1b, 2b and 3b may be designed to reduce the feeder circuit voltage to 4000 volts phase to phase for energizing the network distribution circuit or grid 5. Generally, the network transformers are tap changing transformers designed for tap changing under load.

Protection for the feeder circuits is afforded by the feeder circuit breakers 1a, 2a, 3a and by the network transformer circuit breakers 1c, 2c and 3c. To this end, the transformer circuit breakers are designed to trip when current exceeding a predetermined magnitude is supplied by the network distribution circuit to a fault occurring on any of the feeder circuits. Preferably, each transformer circuit breaker includes directional tripping means which trips the associated breaker substantially instantaneously in response to the reversal of current resulting from the occurrence of a fault on the associated feeder circuit.

Protection for the network distribution circuit or grid 5 is provided not only by the sectionalizing switches 7, 7a and 7b, but by the transformer circuit breakers 1c, 2c and 3c. For this purpose, each of the transformer circuit breakers is provided with overcurrent tripping means preferably operating with inverse time delay. Consequently, if a fault should occur on the network distribution circuit 5 at any point, such as the point 11, the nearest transformer circuit breaker 3c trips after the adjacent sectionalizing switches 7, 7a and 7b have tripped as it is then the only transformer circuit breaker carrying fault current.

The sectionalizing switches 7, 7a and 7b are designed to trip in response to overcurrent, preferably with inverse time delay. Consequently, for the fault at the point 11 the three nearest sectionalizing switches 7, 7a, trip in advance of more distant sectionalizing switches since they are carrying more fault current. The tripping of the network protector and the three sectionalizing switches completely isolates the faulty section of the network distribution circuit 5 from the remainder of the network distribution circuit. Interruption in service consequently is confined to a small section of the network distribution circuit adjacent the fault 11.

For restoring a faulty section to service after clearance of a fault, each of the transformer circuit breakers preferably is provided with automatic reclosing means. This reclosing means may be effective for reclosing each breaker a predetermined number of times, such as three times, after which the breaker is permanently locked out. If the fault at the point 11 clears during the reclosing cycle of the associated transformer breaker 3c, the breaker closes and remains closed, thereby energizing the section of the network distribution circuit on which the fault 11 occurred.

Each of the sectionalizing switches may be designed to reclose when substantially normal voltage appears on both sides thereof. Since the closure of the transformer breaker 3c results in the presence of voltage on both sides of the tripped sectionalizing switches 7 and 7a, these sectionalizing switches close to restore the network distribution circuit to its original normal condition.

If the fault fails to clear within the reclosing cycle of the tripped transformer breaker 3c, the breaker locks out and the three tripped sectionalizing switches 7 and 7a fail to close. Consequently, the faulty section remains out of service until the fault is cleared manually and the tripped transformer breaker 3c is manually reset.

Figure 2:
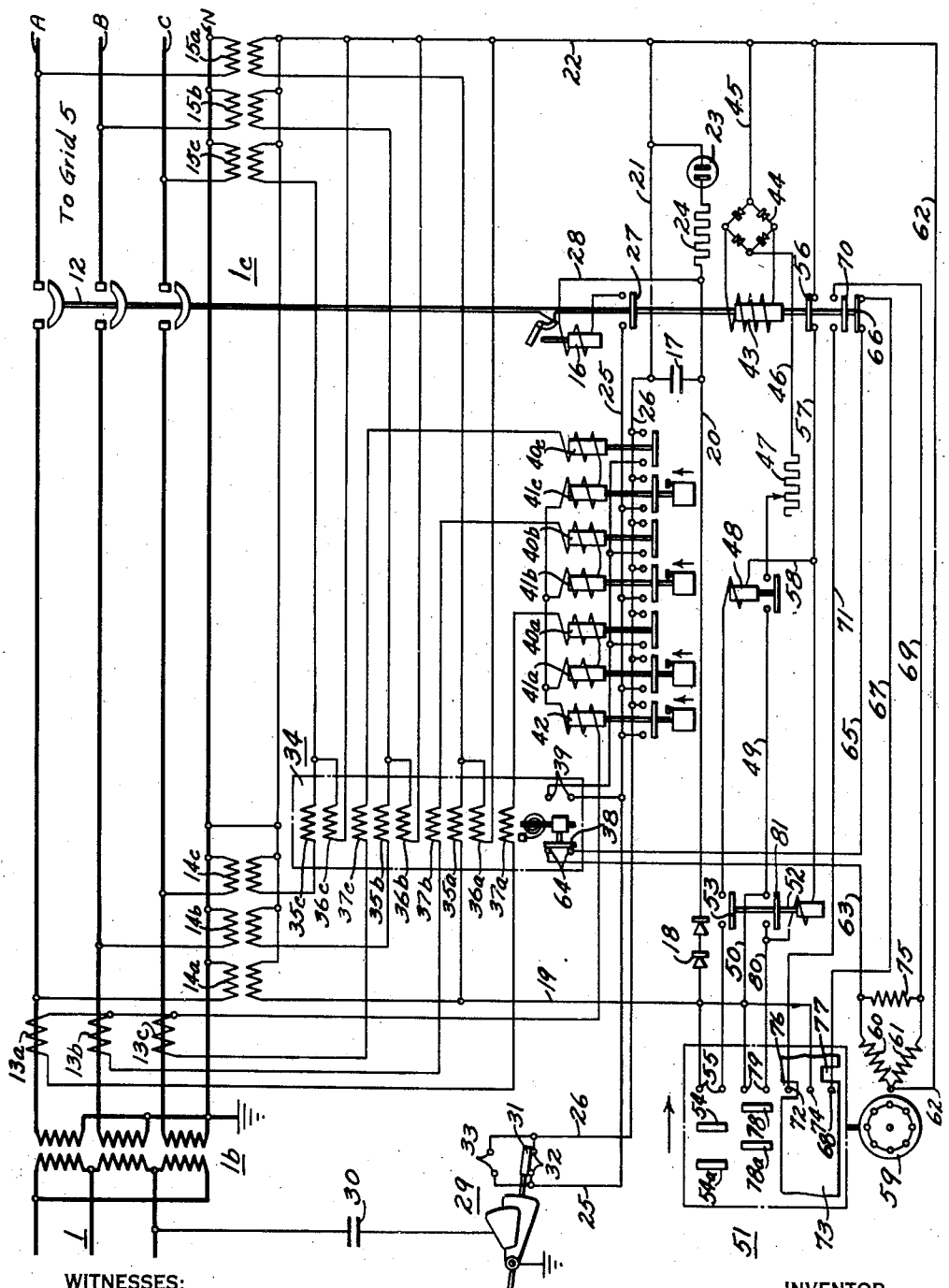
Fig. 2 is a diagrammatic view of a network transformer circuit breaker control system suitable for the system illustrated in Fig. 1.

A network transformer circuit breaker 1c, suitable for the system illustrated in Fig. 1, is shown in detail in Fig. 2. Referring to Fig. 2, the transformer circuit breaker therein illustrated includes a circuit breaker 12 for connecting the network transformer 1b to the network distribution circuit or grid 5. It should be understood that the invention is applicable to single-phase or polyphase service, and that the ratings may be varied as required by the various installations. For purposes of illustration, however, the network distribution circuit or grid 5 is assumed to be designed for three-phase, four-wire service, having three phase conductors A, B and C and a neutral conductor N.

Energy for operating the circuit breaker 12 is derived from the system through a plurality of current and voltage transformers. Current is obtained from three current transformers 13a, 13b and 13c. Voltage is obtained from the feeder circuit side of the circuit breaker 12 through three voltage transformers 14a, 14b and 14c, which are connected, respectively, between each phase conductor and neutral. Similarly, voltage is obtained from the network distribution circuit or grid side of the circuit breaker 12 through three voltage transformers 15a, 15b and 15c.

For tripping the circuit breaker 12, a tripping solenoid 16 is provided which is energized from a capacitor 17. The capacitor 17 is charged from the secondary of one of the voltage transformers 14a through a half-wave rectifier 18 of any suitable design. The energizing circuit for the capacitor 17 may be traced from one terminal of the voltage transformer 14a through a conductor 19, the rectifier 18, a conductor 20, the capacitor 17, a conductor 21 and a bus 22 which constitutes a neutral bus for the six voltage transformers. As illustrated in Fig. 2, a neon lamp 23 is connected across the capacitor 17 in series with a resistance 24. The neon lamp may be employed for indicating the presence of voltage across the capacitor 17.

For controlling the operation of the tripping solenoid 16 a pair of tripping buses 25 and 26 are provided. The bus 25 is connected to one terminal of the tripping solenoid 16 through a pallet switch 27 carried by the circuit breaker 12. The pallet switch 27 is closed when the circuit breaker is closed. The remaining terminal of the tripping solenoid 16 is connected through a conductor 28 to one terminal of the capacitor 17. The remaining terminal of the capacitor 17 is connected to the tripping bus 26. From an inspection of this circuit, it will be observed that any connection between the tripping buses 25 and 26 completes a tripping circuit for the tripping solenoid 16 when the circuit breaker 12 is in closed condition.

If the network transformer 1b in Fig. 2 is provided with a star-connected grounded neutral primary winding, no special provision need be provided for protecting the feeder circuit against ground faults. With such a connection of the primary winding, the usual phase relays suffice for ground fault protection. However, for completeness in illustration, the transformer 1b is illustrated with a delta-connected primary winding and a star-connected grounded neutral secondary winding.

In order to protect the feeder circuit 1 against ground faults occuring thereon, a ground relay 29 is connected between one phase conductor of the feeder circuit and ground through a coupling capacitor 30. This ground relay carries a movable contact 31 which normally floats between a pair of back contacts 32 and a pair of front contacts 33. The relay is designed to close its front contacts when the voltage thereacross increases above a predetermined value, such as 140% of normal voltage. The relay is designed to drop and close its back contacts when the voltage thereacross falls below a predetermined voltage, such as 30% of the normal voltage thereacross. Operation of the relay 29 preferably is accompanied by a small time delay, preferably of the order of ½ second. Conveniently, the relay 29 may be of the electrostatic type.

Upon the occurrence of a ground fault on the feeder circuit 1, the relay 29 will close either its back contacts or front contacts, depending upon which phase conductor of the feeder circuit is faulted. Closure of the front or back contacts of the relay 29 establishes a connecting circuit between the tripping buses 25 and 26, thereby tripping the circuit breaker 12.

For protection against phase faults occurring on the feeder circuit 1, the network protector includes a master relay 34. This master relay includes three phasing windings 35a, 35b and 35c, three voltage windings 36a, 36b and 36c, and three current windings 37a, 37b and 37c. Each of the current windings is connected for energization from a separate one of the current transformers 13a, 13b and 13c in accordance with current passing through one of the phase conductors. Each of the phasing windings is connected for energization from the voltage transformers in accordance with the voltage across one pair of poles of the circuit breaker 12. Each of the voltage windings 36a, 36b and 36c is energized in accordance with the voltage between a separate phase conductor and ground.

When a phase-to-phase or three-phase fault occurs on the feeder circuit 1, the master relay 34 is energized for actuating a movable contact 38 into engagement with a pair of tripping contacts 39. The construction of the master relay and its operation are well understood in the art, suitable constructions being illustrated in my Patents Nos. 1,973,097 and 2,013,836, which are assigned to the Westinghouse Electric & Manufacturing Company.

Generally, it is desirable that the master relay be conditioned for insensitive operation. In other words, the master relay should complete a tripping circuit for the circuit breaker 12 only when current above a predetermined magnitude flows to a fault occurring on the feeder circuit 1. Instead of modifying the characteristics of the master relay 34, such insensitive operation may be provided by placing the tripping contacts 39 of the master relay in series with the contacts of three overcurrent relays 40a, 40b and 40c. The energizing windings for these overcurrent relays may be connected in series, respectively, with the current windings 37a, 37b and 37c for energization from the secondaries of the current transformers 13a, 13b and 13c. Each of the relays 40a, 40b and 40c is designed to close its contacts substantially instantaneously when a current in excess of a predetermined value, such as a current corresponding to 300% of normal load current, passes therethrough. Closure of the tripping contacts 39 and the contacts of any one of the relays 40a, 40b and 40c completes a tripping circuit across the tripping buses 25 and 26 for tripping the circuit breaker 12. Such tripping occurs substantially instantaneously or with a delay of the order of $\frac{1}{10}$ of a second.

As above indicated, the circuit breaker 12 should trip when excessive current flows therethrough to a fault occurring on an adjacent section of the network distribution circuit or grid 5. To this end, three overcurrent phase relays 41a, 41b and 41c have their energizing windings connected in series respectively, with the energizing windings of corresponding relays 40a, 40b and 40c, and corresponding current windings 37a, 37b and 37c for energization from the secondaries of the current transformers 13a, 13b and 13c. Consequently, these relays 41a, 41b and 41c are energized respectively in accordance with the phase currents flowing to a fault occurring in the network distribution circuit or grid 5. Preferably, these relays operate with inverse time delay in a minimum time of approximately $1\frac{1}{10}$ seconds when current above a predetermined value, such as 300% of normal load current, flows to a fault occurring in the network distribution circuit 5.

For protection against ground faults occurring in the network distribution circuit or grid 5, an additional relay 42 has its energizing winding connected in the neutral return conductor for the current transformers 13a, 13b and 13c. This relay is designed to operate and close its contacts, preferably with an inverse time delay having a minimum delay of the order of $1\frac{1}{10}$ seconds, when a ground fault occurs on the network distribution circuit or grid 5. It will be noted that closure of the contacts of any one of the relays 41a, 41b, 41c or 42, completes a circuit across the tripping buses 25 and 26 and trips the circuit breaker 12.

From the foregoing discussion, it will be apparent that the circuit breaker 12 trips practically instantaneously when a phase-to-phase or three-phase fault occurs on the feeder circuit 1, that the circuit breaker 12 trips with a time delay of the order of ½ second when a ground fault occurs on the feeder circuit 1, and that the circuit breaker 12 trips with a time delay of the order of $1\frac{1}{10}$ seconds when a phase or ground fault occurs on the network distribution circuit 5.

For closing the circuit breaker 12, a closing motor or solenoid 43 has its energizing winding connected across the output terminals of a rectifier 44. The rectifier may be of any desired construction, but as illustrated, it consists of a full-wave rectifier employing contact type copper oxide disc rectifiers. One input terminal of the rectifier 44 is connected through a conductor 45 to the neutral bus 22. The remaining terminal of the rectifier is connected through a conductor 46, a variable resistance 47, the contacts of a closing relay 48, a conductor 49, a conductor 50 and the conductor 19 to one terminal of the secondary winding of the voltage transformer 14a. Consequently, when the contacts of the closing relay 48 are closed, the closing solenoid 43 is energized from the voltage transformer 14a.

Operation of the closing relay 48 is determined by a drum-type controller 51 and by a setup relay 52. Two conditions are required to complete an energizing circuit for the closing relay 48. In the first place, the setup relay 52 must be actuated to its closed position wherein its movable contact 53 partially completes an energizing circuit for the closing relay 48. In the second place, one of the contact bars 54 carried by the drum of the controller 51 must bridge contacts 55. When these two conditions obtain, an energizing circuit for the closing relay 48 is established which may be traced from the neutral bus 22 through back contacts of a pallet switch 56, carried by the circuit breaker 12, a conductor 57, a conductor 58, the energizing winding of the closing relay 48, front contacts 53 of the setup relay 52, the contacts 55, and the conductor 19 to one terminal of the secondary winding of the voltage transformer 14a. It should be noted that the circuit breaker can close only when voltage is present on the feeder circuit.

Operation of the setup relay 52 and of the contact bar 54 both are controlled by operation of the drum controller 51. To this end, the drum controller includes a reversible motor 59 which may be of the conventional split-phase type having two phase windings 60 and 61. A terminal of each of the phase windings is connected through a common conductor 62 to the neutral bus 22. The remaining terminal of the phase winding 60 is connected through a conductor 63, closing contacts 64 on the master relay 34, a conductor 65, back contacts of a pallet switch 66 carried by the circuit breaker 12, and a conductor 67 to one fixed terminal 68 associated with the drum controller 51. The remaining terminal of the phase winding 61 is connected through a conductor 69, front contacts of a pallet switch 70 carried by the circuit breaker 12, and a conductor 71 to another fixed terminal 72 associated with the drum controller 51. A continuous cylindrical contact 73 carried by the drum controller determines the connections of the fixed contacts 72 and 68 to one terminal of the secondary winding of the transformer 14a through a fixed contact 74 and the conductor 19.

It will be noted that the fixed contact 72 is connected to the motor 59 through the pallet switch 70 only when the circuit breaker is in closed condition. It will be noted further that the fixed contact 68 is connected to the conductor 63 through the pallet switch 66 and the closing contact 64 only when the circuit breaker 12 is in open condition and the master relay 34 is in closing condition. Depending on which of the fixed contacts 68 or 72 is operatively connected to the motor, one of the phase windings 60 or 61 will be connected across the secondary winding of the voltage transformer 14a.

In order to determine the direction of rotation of the motor 59, a reactive impedance 75 is connected between the conductors 63 and 69. For purpose of illustration, this reactive impedance is illustrated as an inductive reactance. When the closing contacts 64 of the master relay and the pallet switch 66 are closed to connect the phase winding 60 across the secondary winding of the voltage transformer 14a, the direction of rotation of the motor 59 is such that the drum of the drum controller moves in the direction indicated by the arrow. On the other hand, when the pallet switch 70 closes to connect the phase winding 61 across the secondary winding of the voltage transformer 14a, the direction of rotation of the motor 59 reverses to rotate the drum of the drum controller in a direction opposite to that indicated by the arrow.

It will be noted that the cylindrical contact 73 is provided with two notches 76 and 77. The purpose of these notches is to limit the total movement of the drum controller. Assuming that the drum controller is in its normal condition, as illustrated in Fig. 2, if the motor 59 is energized to actuate the drum of the controller in the direction of the arrow, the maximum movement of the drum is slightly less than one full revolution. This maximum movement is determined by the entry of the fixed contact 68 into the notch 77 to interrupt the energizing circuit for the motor 59.

If the drum controller has been actuated away from the normal position illustrated in Fig. 2, and the motor 59 consequently is reversed to restore the motor to its initial condition, the drum of the controller will move in a direction opposite to the arrow until the fixed terminal 72 reenters the notch 76. Such entry interrupts the energizing circuit for the motor 59 and brings the drum controller to rest.

Assuming that the parts are in the positions illustrated in Fig. 2, and that the feeder circuit 1 subsequently is energized, if the phase conditions across the terminals of the circuit breaker 12 are correct the master relay 34 operates to close its closing contacts 64. Such closure completes an energizing circuit for the motor 59 and actuates the drum of the controller in the direction indicated by the arrow.

In response to a predetermined movement of the drum, a contact bar 78 carried by the drum of the controller bridges a pair of fixed contacts 79. Closure of the fixed contacts completes an energizing circuit for the setup relay 52 which may be traced from the neutral bus 22, through back contacts on the pallet switch 56, the conductor 57, the energizing winding for the setup relay 52, a conductor 80, the contacts 79 and the conductor 19 to one terminal of the secondary winding of the voltage transformer 14a. Completion of this circuit actuates the setup relay 52 and establishes a holding circuit for the relay which may be traced from the neutral bus 22 through the back contacts of the pallet switch 56, the conductor 57, the energizing winding of the setup relay 52, front contacts 81 of the setup relay, the conductor 50 and the conductor 19 to one terminal of the secondary winding of the voltage transformer 14a. At the same time, the closure of the setup relay 52 operates through the front contacts 53 to partially set up an energizing circuit for the closing relay 48. This condition is retained until the contact bar 54 bridges the fixed contacts 55. This may occur after the lapse of a predetermined time, such as 5 seconds from the initiation of movement of the drum controller. As above indicated, the bridging of the contacts 55 completes an energizing circuit for the closing relay 48 and this relay closes its contacts to energize the closing motor or solenoid 43.

The closure of the circuit breaker 12 opens the back contacts of the pallet switch 56 and consequently deenergizes the closing relay 48 and the setup relay 52. These relays thereupon return to the positions illustrated in Fig. 2.

In addition, closure of the circuit breaker 12 opens the back contacts of the pallet switch 66 to interrupt the energizing circuit for the motor 59 and the forward movement of the drum controller, therefore, ceases.

When the circuit breaker 12 closes, the front contacts of the pallet switch 70 close to establish a reversing circuit for the motor 59. The motor thereupon rotates the drum of the controller in a direction opposite to that indicated by the arrow until the fixed contact 72 again is positioned over the limit notch 76. At this time, all of the parts in Fig. 2 are in the positions illustrated, except that the circuit breaker 12 is closed and the relay 29 is in its floating condition.

The foregoing description of the operation of the reclosing mechanism for the circuit breaker 12 has been based on the assumption that the circuit breaker remains closed after the initial energization of its closing solenoid 43. However, if the fault causing the tripping of the circuit breaker 12 fails to clear before the first closure, the circuit breaker trips before the motor 59 resets the drum controller 51 to its initial condition. The operation of the closing mechanism under these circumstances now will be set forth.

If the circuit breaker 12 trips after its first reclosure, the closure of the back contacts of the pallet switch 66 restores the energizing circuit for the forward operation of the motor 59. Consequently, the drum of the controller 51 continues rotation in the direction of the arrow without resetting to its normal position. The movement of the drum continues until a second contact bar 78a bridges the fixed contacts 79. This second bridging of the fixed contacts 79 again operates to energize the setup relay 52, which partially conditions the actuating coil for the closing relay 48 for energization. Continued rotation of the drum brings a contact bar 54a into bridging relationship across the fixed contacts 55. This again completes the energizing circuit for the closing relay 48 and the closing solenoid 43 again is energized to close the circuit breaker 12.

By operation of the pallet switches carried by the circuit breaker, the second reclosure of the circuit breaker deenergizes the setup relay 52 and the closing relay 48. In addition, the reversible motor 59 is energized in a direction suitable for carrying the drum of the controller to its initial condition.

If the circuit breaker 12 again trips following its second reclosure, the forward rotation of the drum 51 is resumed before the drum can be reset appreciably. The reclosure of the circuit breaker followed by its tripping can be continued until the forward rotation of the drum carries the limit notch 77 over the fixed contact 68. This interrupts the energizing circuit for the motor 59 and no further forward motion thereof is possible.

By providing a suitable number of contact bars similar to the bars 54 and 78, and by properly spacing these bars, as many reclosures as desired prior to lockout may be obtained. As an example of a suitable reclosing cycle, the circuit breaker 12 may be reclosed at intervals of 5, 10 and 30 seconds followed by lockout.

Figure 3:
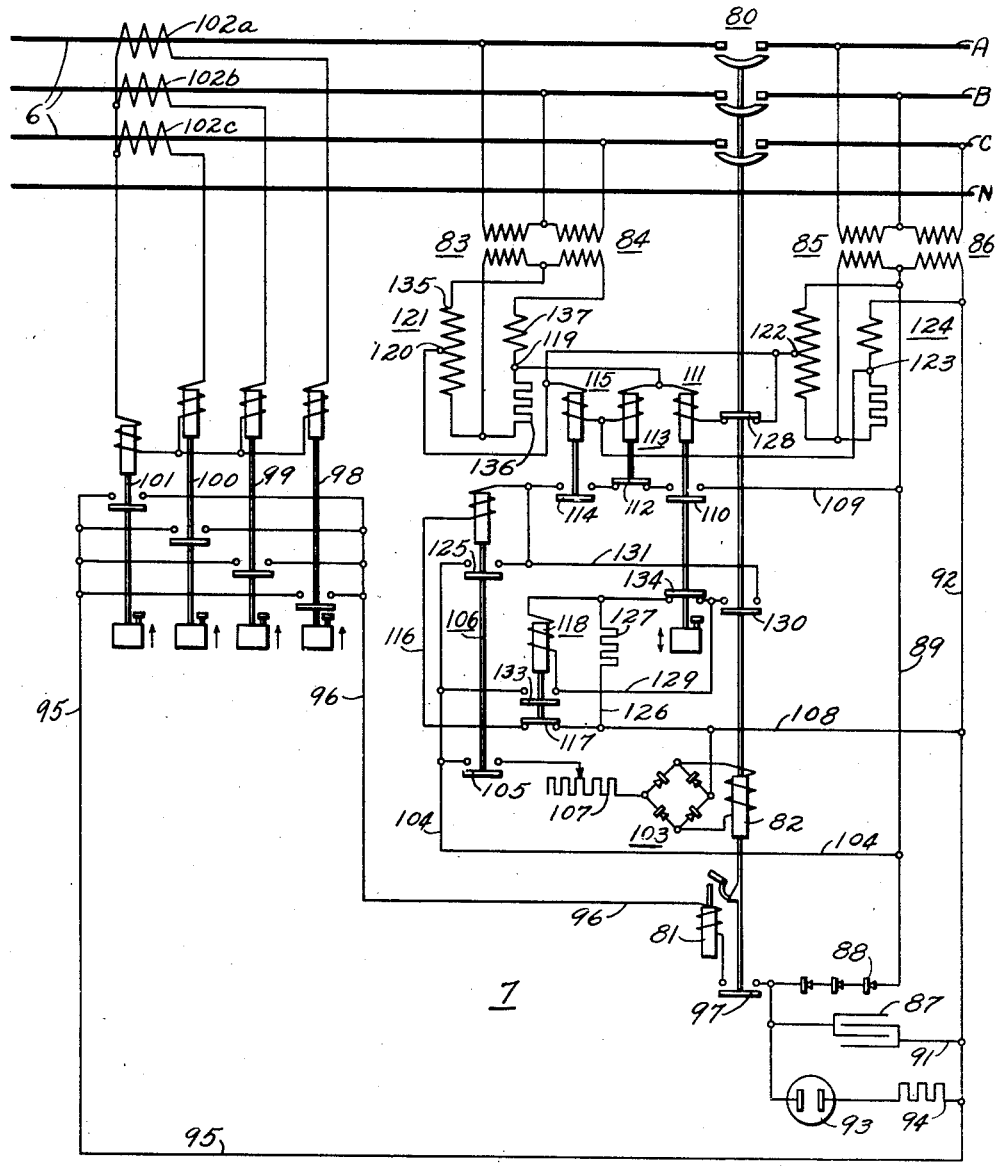
Fig. 3 is a diagrammatic view of a sectionalizing switch control system suitable for the system illustrated in Fig. 1.

A design suitable for a sectionalizing switch 7 is illustrated in detail in Fig. 3. This sectionalizing switch includes a circuit breaker 80 for connecting portions of the network main 6.

Tripping of the circuit breaker 80 is effected by a tripping solenoid 81, and closure of the circuit breaker is effected by a closing solenoid 82. For operating the circuit breaker 80, a pair of voltage transformers 83 and 84 have their primaries connected in open delta across the network main 6 on one side of the circuit breaker. A second pair of voltage transformers 85 and 86 have their primaries connected in open delta across the network main on the second side of the circuit breaker.

Energy for actuating the tripping solenoid 81 is derived from a capacitor 87 which is energized from the secondary winding of the voltage transformer 86 through a suitable half-wave rectifier 88. This energizing circuit may be traced from one terminal of the secondary winding of the voltage transformer 86 through a conductor 89, the rectifier 88, the condenser 87, a conductor 91, and a conductor 92 to the remaining terminal of the secondary winding of the voltage transformer 86. As illustrated in Fig. 3, a neon lamp 93 is connected in series with a resistance 94 across the capacitor 87. The neon lamp may be employed for indicating voltage across the condenser 87.

The tripping solenoid 81 is energied by the completion of a circuit between two tripping buses 95 and 96. This energizing circuit may be traced from one terminal of the condenser 87 through front contacts on a pallet switch 97 carried by the circuit breaker 80, the energizing winding for the solenoid 81, the tripping bus 96 and the tripping bus 95.

Completion of the circuit between the tripping buses is effected by any one of four relays 98, 99, 100 and 101. Three current transformers 102a, 102b and 102c, having their secondaries connected in star, are employed for energizing the relays. By reference to Fig. 3, it will be noted that the relays 98, 99 and 100 are energized from the transformers in accordance with current passing through the three phase conductors A, B and C, respectively. The remaining relay 101 is connected in the neutral circuit of the current transformers for energization in accordance with residual or ground current. Consequently, if a phase-to-phase, three-phase, or ground fault occurs on the network main 6, at least one of the relays 98, 99, 100 and 101 will be energized to complete a tripping circuit between the tripping buses 95 and 96. Preferably, the relays operate with inverse time delay having a minimum tripping time of approximately 0.6 of a second.

For actuating the closing solenoid of the circuit breaker 80, the energizing winding of the closing solenoid 82 is connectd across the output terminals of a rectifier 103. This rectifier may be of any desired construction, but for the purpose of illustration, a full-wave contact rectifier employing copper oxide discs may be employed.

The rectifier 103, in turn, is connected for energization from the secondary winding of the voltage transformer 86 through a circuit which may be traced from one terminal of the secondary winding through the conductor 89, a conductor 104, front contacts 105 of a closing relay 106, an adjustable resistance 107, the rectifier 103, a conductor 108, through the conductor 92 to the remaining terminal of the secondary winding. It will be noted that closure of the circuit breaker 80 requires actuation of the closing relay 106.

The energizing winding of the closing relay 106 is energized from the secondary winding of the voltage transformer 86 through the conductor 89, a conductor 109, front contacts 110 of a control relay 111, back contacts 112 of an undervoltage relay 113, front contacts 114 of a control relay 115, the energizing winding of the closing relay 106, a conductor 116, back contacts 117 of an auxiliary relay 118, the conductor 108 and the conductor 92 back to the secondary winding of the voltage transformer 86.

It will be noted that energization of the closing relay 106 requires closure of the contacts 110, 112 and 114, which are carried respectively, by the relays 111, 113 and 115. The energizing winding of the control relay 111 is energized through the back contacts of a pallet switch 128 carried by the circuit breaker 80 from the output terminals 119 and 120 of a positive sequence voltage filter 121.

The control relay 115 has its energizing winding connected to the output terminals 122 and 123 of a positive sequence voltage filter 124.

The positive sequence voltage filter 121 is connected for energization from the secondary windings of the voltage transformers 83 and 84 to produce an output dependent upon the positive sequence voltage component present on one portion of the network main 6. The positive sequence voltage filter 124 is connected for energization from the voltage transformers 85 and 86 to produce an output dependent on the positive sequence voltage component present on the network main on the opposite side of the circuit breaker 80.

Consequently, the controlled relays 111 and 115 are energized in accordance with the positive sequence voltage present on opposite sides of the circuit breaker 80. Each of these relays is designed to pick up and close its front contacts when its energizing voltage is equal to or in excess of a voltage corresponding to approximately 90% of the normal positive sequence voltage. The energizing windings of these relays may be required at times to carry approximately 110% of their normal rated voltage continuously.

Preferably, the control relay 111 is a time delay relay having a time delay of the order of 2 or 3 seconds when energized by its normal rated voltage. This provides a time delay in the closure of the circuit breaker 80 of 2 or 3 seconds. If desired, the control relay 111 may be provided with a similar time delay in its drop out direction as well as in its pick up direction.

The undervoltage relay 113 has its energizing winding connected for energization in accordance with the vector difference in the outputs of the positive sequence voltage filters 121 and 124. This relay is designed to pick up and open its back contacts when energized by a voltage in excess of approximately 80% of the normal positive sequence voltage output of the filter. It is designed to drop out and close its back contacts on a maximum of 45% of the positive sequence voltage output of a filter or as much less than 45% as possible. The purpose of this relay is to prevent closure of the circuit breaker 80 if the phase conditions across the terminals of the circuit breaker 80 are incorrect. If in repairing the network main 6, two phase conductors are interchanged, or three phase conductors are rotated 120° or 240°, the phasing relay will operate to prevent closure of the circuit breaker. This relay may be required occasionally to carry 173% of its normal rated voltage.

If the positive sequence voltage present in the network main on each side of the circuit breaker 80 is in excess of 90% of its normal value, and if the phase conditions across the poles of the circuit breaker 80 are correct, the contacts of the relays 113 and 115 are in closed condition and the front contacts 110 of the control relay 111 close at the expiration of two or three seconds to complete an energizing circuit for the closing relay 106. In closing, the closing relay 106 establishes a holding circuit for itself which may be traced from the secondary winding of the voltage transformer 86 through the conductor 92, the conductor 108, the back contacts 117 of the auxiliary relay 118, the conductor 116, the energizing winding of the closing relay 106, front contacts 125 of the closing relay 106, the conductor 104, and the conductor 89 back to the voltage transformer 86. Operation of the closing relay 106 also closes the front contacts 105 to complete an energizing circuit for the closing solenoid 82.

Closure of the circuit breaker 80 completes an energizing circuit for the auxiliary relay 118. This circuit may be traced from the secondary winding of the voltage transformer 86, through the conductor 92, the conductor 108, a conductor 126, a resistance 127, the energizing winding of the auxiliary relay 118, a conductor 129, front contacts of a pallet switch 130 carried by the circuit breaker 80, a conductor 131, the front contacts 125 of the closing relay, the conductor 104, and the conductor 89 back to the voltage transformer 86.

Actuation of the auxiliary relay 118 opens the back contacts 117 to deenergize the closing relay 106. In addition, the auxiliary relay 118 completes a holding circuit for itself which may be traced from the secondary winding of the voltage transformer 86 through the conductor 92, the conductor 108, the conductor 126, the resistance 127, the energizing winding of the relay 118, front contacts 133 of the auxiliary relay 118, the conductor 104, and the conductor 89 back to the voltage transformer 86.

Consequently, the auxiliary relay 118 remains in its actuated position and prevents further operation of the closing relay 106. This condition continues until the control relay 111 completely resets to establish a shunt around the energizing winding of the auxiliary relay 118. This shunt is established by the closing of back contacts 134 carried by the control relay 111. The provision of the auxiliary relay 118 prevents pumping of the circuit breaker 80. For example, if the circuit breaker 80 were to close and promptly trip with the voltage on each side substantially normal, the circuit breaker would reclose again without substantial time delay were it not for the auxiliary relay 118. As above indicated, the auxiliary relay 118, under these conditions, would remain in its picked up condition with its back contacts 117 open to prevent energization of the closing relay 106.

The construction of the positive sequence voltage filters may be similar to that illustrated in the Lenehan Patent No. 1,936,797, which is assigned to the Westinghouse Electric & Manufacturing Company. Each of these voltage filters comprises, in general, an auto-transformer 135 having a 40% tap 120 or 122. In addition, each filter includes a resistor 136 and a reactor 137. The various elements of each filter are so related that the voltage drop across the resistor 136 is equal to the same percentage of the total voltage impressed on the resistor 136 and the reactor 137 in series as the ratio of the auto-transformer 135, but lags the total voltage impressed on the resistor and reactor by 60°. Assuming that the phase rotation of the three-phase circuit is in the order A—B—C, each of the filters will have an output proportional to the positive sequence voltage component present on its portion of the three-phase circuit.

From the foregoing description of the component parts of the distribution system illustrated in Fig. 1, it is believed that the operation of the complete system may be set forth clearly. Assuming that the entire system is deenergized, if the feeder circuit breakers 1a, 2a and 3a are closed, voltage is impressed on the control circuits for the transformer circuit breakers 1c, 2c and 3c. These breakers close at the expiration of their initial time delays to energize all sections of the network distribution circuit 5. Since voltage is present on both sides of each of the sectionalizing switches 7, 7a and 7b, and assuming that the positive sequence voltage components present on each side of each sectionalizing switch are in excess of 90% of the normal value, and assuming further that the phase conditions across the terminals of each sectionalizing switch are correct, the sectionalizing switches close at the expiration of their two- or three-second time delay to interconnect completely the network distribution circuit.

Should a fault to ground occur on one of the phase conductors of a feeder circuit, such as the feeder circuit 1, the ground relays 29 associated with the transformer circuit breakers 1c close either their front or back contacts, depending on which phase conductor is grounded, to trip the associated network protectors. This tripping occurs with a time delay of approximately ½ second. Under these circumstances, the entire network distribution circuit 5 continues to receive energy from the good feeder circuits 2 and 3.

After clearance of the ground fault, the application of voltage to the transformer breakers 1c actuates the drum controller 51 of these network protectors to close the associated breakers and normal operation of the system consequently obtains.

If a phase-to-phase or three-phase fault occurs on one of the feeder circuits, such as the feeder circuit 1, the master relay 34 associated with each of the transformer circuit breakers 1c is actuated to close its stripping contacts. If at the same time, the current flowing to the fault is in excess of a predetermined value, such as 300% of the rated load value, one or more of the instantaneous overcurrent relays 49a, 49b, 49c associated with the transformer circuit breakers 1c close to complete a tripping circuit for each of these breakers. Consequently, the feeder circuit 1 is again removed from service until the fault thereon is cleared. It is to be understood that when a fault occurs on a feeder circuit, the feeder circuit breaker, such as breaker 1a, operates in the customary manner to disconnect the feeder circuit from the bus 4.

With the distribution system operating normally, if a fault should occur on the network distribution circuit as at the point 11, excessive current will flow to the fault. The circuit breakers carrying the largest amount of this fault current are those associated with the nearest sectionalized switches 7 or 7a, and the nearest transformer circuit breaker 3c.

Depending upon whether the fault is a phase-to-phase fault, a three-phase fault, or a phase-to-ground fault, one or more of the relays 98, 99, 100 and 101 associated with each of the sectionalizing switches adjacent the fault, will operate to trip the three adjacent sectionalizing switches. Because of their inverse time delay characteristics, the adjacent sectionalizing switches will trip to remove only the small faulty section from the remainder of the distribution circuit at the expiration of a minimum time of .6 of a second.

At the expiration of a minimum time of $1\frac{1}{10}$ seconds, one or more of the relays 41a, 41b, 41c and 42 operate to trip the nearest network transformer circuit breaker. This completely isolates the small faulty section from the remainder of the distribution circuit and from the feeder circuits.

At the expiration of its initial delay in closing, the tripped transformer circuit breaker recloses. If the fault has cleared in the meantime, the transformer circuit breaker remains closed, but if the fault is still present, the breaker again trips. If the fault is permanent, the tripped transformer circuit breaker goes through its complete reclosing cycle of three reclosures and then locks out. However, if the fault clears before completion of the closing cycle, the tripped transformer circuit breaker remains closed.

With the transformer circuit breaker locked out, the sectionalizing switches 7 and 7a which have been tripped, remain in their tripped conditions for the reason that voltage appears on only one side of these sectionalizing switches. Under these circumstances, the entire network distribution circuit continues to provide service except for the small faulty section adjacent the fault 11.

Assuming that the fault clears and that the adjacent transformer circuit breaker closes and remains closed, the sectionalizing switches 7 and 7a which were tripped, reclose with a possible time delay of two or three seconds. Such closure presupposes that the phase conditions across the sectionalizing switches are correct, and that the positive phase sequence voltages on each side of the sectionalizing switches are in excess of 90% of their normal values. With the closure of the sectionalizing switches the entire system is restored to normal operation.

In Fig. 2, the controls illustrated for the circuit breaker 12 prevent closure of the circuit breaker if the phase conditions across the poles thereof are incorrect. If such protection against incorrect phasing is unnecessary, the control circuits for the circuit breaker 12 may be simplified appreciably. Such a simplification is illustrated in Fig. 4.

Figure 4:
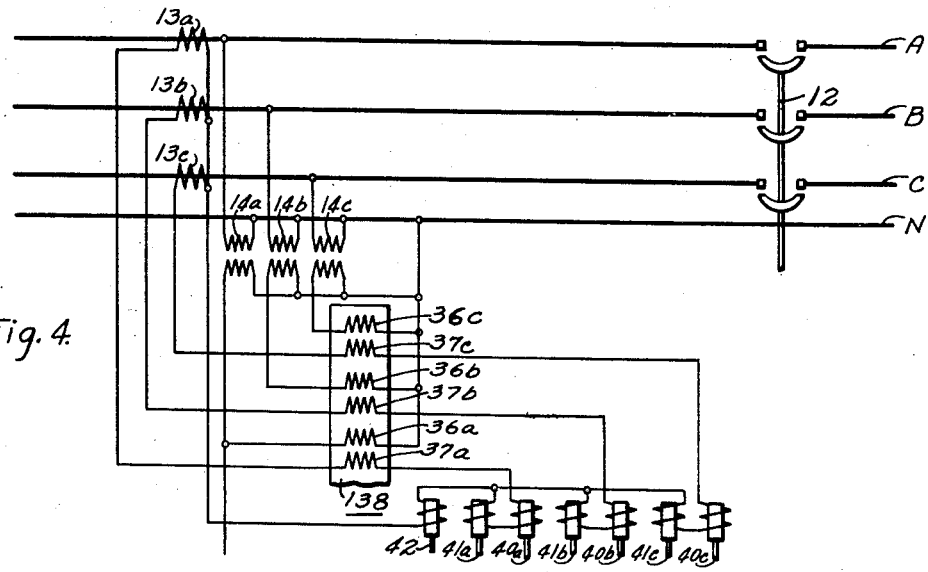
Fig. 4 is a diagrammatic view with parts broken away showing a modification of the network transformer circuit breaker control system illustrated in Fig. 2.

Referring to Fig. 4, it will be noted that the voltage transformers 15a, 15b and 15c are omitted. Moreover, in place of the master relay 34 of Fig. 2, a simplified master relay 138 is shown. The master relay 138 is similar to the master relay 34 except for the omission of the phasing windings. It will be noted that each of the voltage windings 36c, 36b and 36a in Fig. 4 is energized from one of the voltage transformers 14a, 14b and 14c. The connections and operation of the control circuits for the circuit breaker 12 in Fig. 4 otherwise are similar to those shown and described for Fig. 2. For simplicity in illustration, Fig. 4 has been restricted to the portion of Fig. 2 which has been modified.

Similarly, the control circuits for the sectionalizing switches 7 may be simplified by omitting the phasing control, if phasing is not required. This simplified control is illustrated in Fig. 5.

Figure 5:
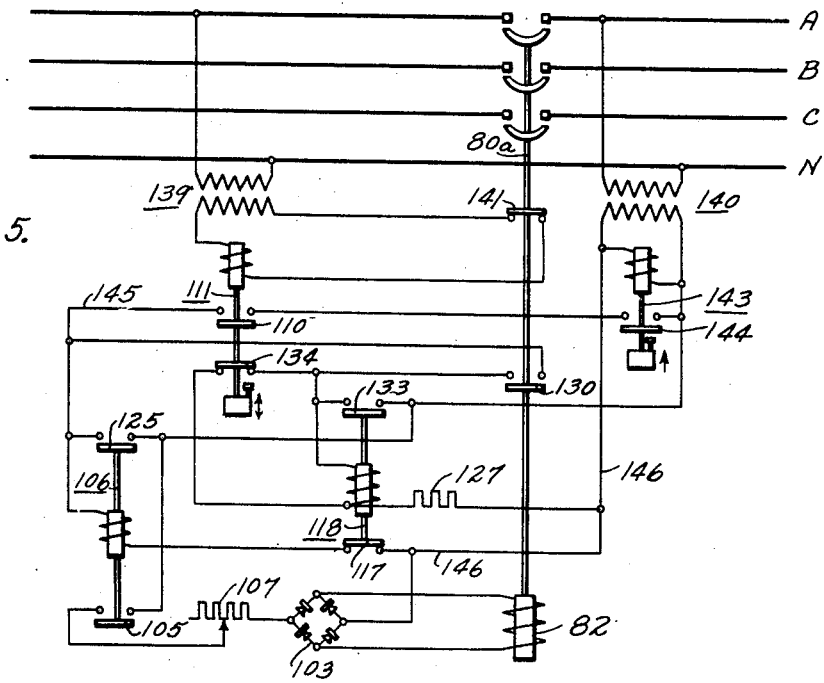
Fig. 5 is a diagrammatic view showing a modification of the sectionalizing switch control system illustrated in Fig. 3.

Referring to Fig. 5, a circuit breaker 80a is illustrated which corresponds to the circuit breaker 80 of Fig. 3. The tripping control circuits for this circuit breaker 80a are similar to those employed in Fig. 3, but have been omitted for clarity in illustration. Two voltage transformers 139 and 140 are connected between the phase conductor A and neutral on opposite sides of the circuit breaker 80a. These voltage transformers suffice to energize the control circuits for the circuit breaker 80a. The secondary winding of the transformer 139 is connected through the back contacts of a pallet switch 141 carried by the circuit breaker 80a to the energizing winding of the control relay 111. The secondary winding of the voltage transformer 140 is connected to the energizing winding of a second control relay 143 which corresponds to the control relay 115 of Fig. 3.

The control relay 111 is designed to operate and close its front contacts 110 when the phase A to neutral voltage applied to the transformer 139 is above approximately 90% of its normal rated value. Similarly, the relay 143 is designed to close its front contacts 144 when the phase A to neutral voltage applied to the transformer 140 is above approximately 90% of its normal rated value. Closure of the contacts 110 and 144 completes an energizing circuit for the closing relay 106. This energizing circuit may be traced from one terminal of the voltage transformer 140 through the contacts 144 and 110, a conductor 145, the energizing winding of the relay 106, the back contacts 117 of the auxiliary relay 118 and a conductor 146, back to the voltage transformer 140. As in Fig. 3, actuation of the closing relay 106 completes a closing circuit for the closing solenoid 82 employed for closing the circuit breaker 80a and also establishes a holding circuit for the relay 106.

As also shown in Fig. 3, closure of the pallet switch 130 which is carried by the circuit breaker 80a, operates to energize the auxiliary relay 118. Actuation of the auxiliary relay 118 deenergizes the closing relay 106 and prevents further actuation thereof until the control relay 111 closes its back contacts to shunt the auxiliary relay energizing winding.

If no time delay were provided on the control relay 143, it would be desirable to increase the time delay on the control relay 111 to approximately one minute to prevent closure of the circuit breaker 80a during the reclosing cycle of a nearby transformer circuit breaker. This is for the reason that certain faults occurring on the side of the circuit breaker 80a which energizes the transformer 140, may not drop the voltage from phase A to neutral appreciably. Consequently, the control relay 111 would remain in its picked up condition and the control relay 143 would close as soon as the associated transformer circuit breaker closes to prematurely close the circuit breaker 80a.

As above indicated, the control relay 111 may be provided with a long time delay of the order of one minute, to guard against premature closing of the circuit breaker 80a. Preferably, however, both of the control relays 111 and 143 may be provided with substantially equal time delays of the order of 2 or 3 seconds, and such a construction has been illustrated in Fig. 5.

It should be noted that the relay 115 of Fig. 3 may be given a time delay similar to that of the relay 143 of Fig. 5. However, this is unnecessary in Fig. 3 for the reason that the relay 115 is energized in accordance with positive sequence voltages. If a fault occurs on the side of the circuit breaker 80 which energizes the voltage transformers 85 and 86, it is unlikely that the positive sequence voltage applied to the relay 115 will be sufficient to actuate the relay.

If phasing is required on neither the transformer circuit breaker nor the sectionalizing switches, the constructions illustrated in Figs. 4 and 5 both may be employed.

Referring again to Fig. 1, it will be noted that under some conditions, the operation of the system is not entirely satisfactory. For example, assume that the feeder circuit 1 is out of service and that a fault occurs on the distribution circuit 5 at the point 11. Under these conditions, both of the corner sectionalizing switches 7a will trip since equal fault current flows through both of these sectionalizing switches to the fault. In addition, the sectionalizing switches 7 adjacent the fault and the transformer circuit breaker 3c adjacent the fault trip to clear completely the faulted section from the remainder of the distribution circuit.

If the fault at the point 11 clears prior to the completion of the reclosure cycle of the adjacent network protector 3c, the adjacent sectionalizing switches 7 which tripped, reclose for the reason that voltage appears on both sides thereof. However, the sectionalizing switches 7a remain tripped for the reason that the adjacent transformer circuit breaker 1c is open and voltage cannot appear on this side of the sectionalizing switches 7a. With sectionalizing switches 7a of the construction illustrated in Fig. 3, the corner section normally energized directly from the feeder circuit 1 would remain out of service despite the fact that the fault had cleared promptly.

Figure 6:
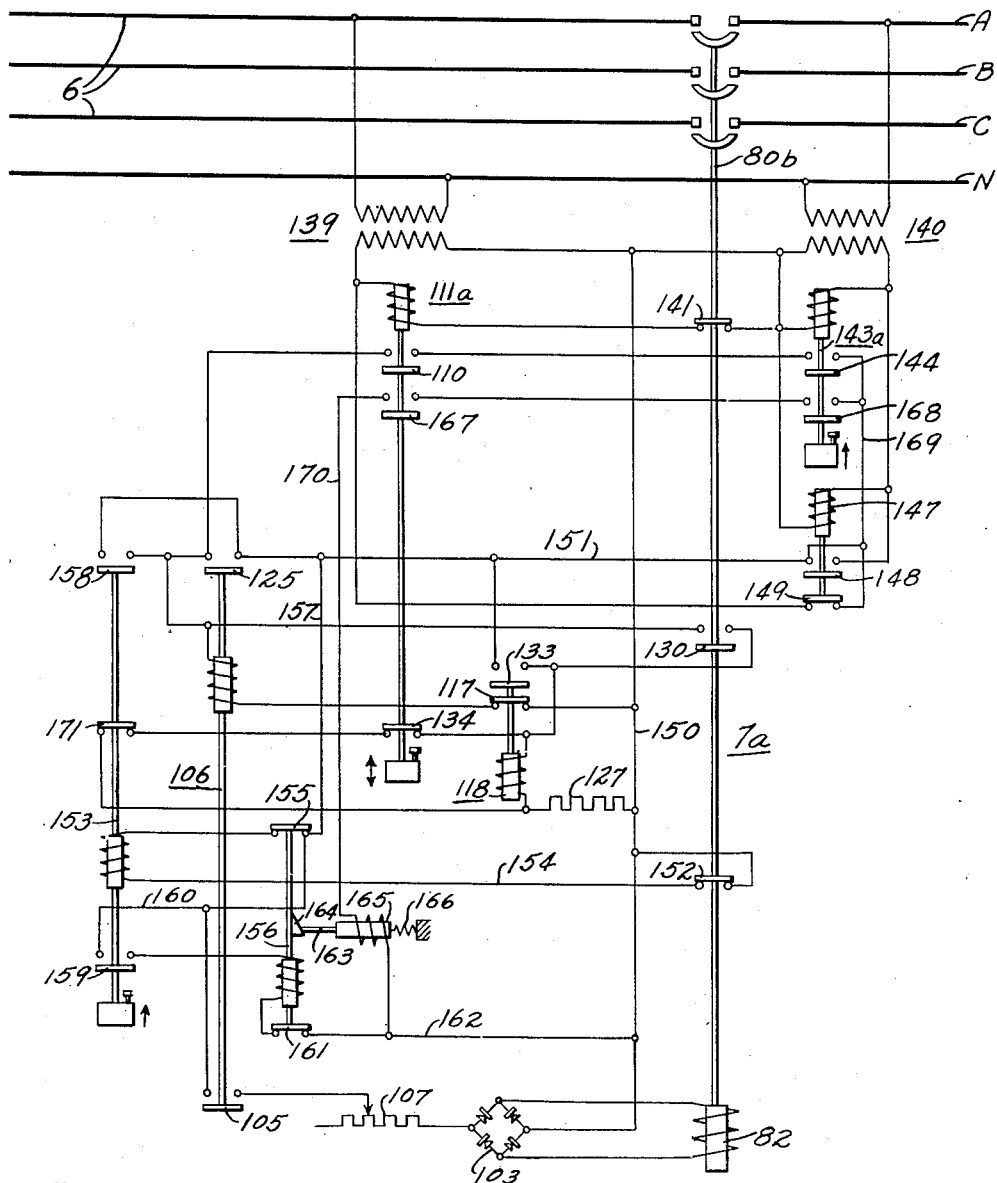
Fig. 6 is a diagrammatic view showing a modified sectionalizing switch control system designed in accordance with the invention.

In order to permit closure of the sectionalizing switches 7a under the aforesaid circumstances, the design of these switches may be modified as illustrated in Fig. 6.

Referring to Fig. 6, a circuit breaker 80b, which corresponds to the circuit breaker 80a of Fig. 5 is illustrated. The controls for this circuit breaker include control relays 111a and 143a, which correspond to the relays 111 and 143 of Fig. 5. When the voltage from phase A to neutral on each side of the circuit breaker 80b is in excess of 90% of its normal value, the relays 111a and 143a close to complete through their front contacts 110 and 144, an energizing circuit for the closing relay 106. As indicated with reference to Figs. 3 and 5, actuation of the closing relay 106 establishes an energizing circuit for the closing solenoid 82 of the circuit breaker 80b and also establishes a holding circuit for the relay 106. In addition, as also pointed out in connection with Figs. 3 and 5, closure of the pallet switch 130 carried by the circuit breaker 80b, completes an energizing circuit for the auxiliary relay 118. Actuation of the auxiliary relay 118, it will be remembered, deenergizes the closing relay 106 and prevents further energization of the closing relay until deenergization of the auxiliary relay 118.

From the description of Fig. 6 thus far set forth, it will be appreciated that the normal closing operation of the circuit breaker 80b is similar to that of the circuit breaker 80a of Fig. 5. In addition to the closing control circuits thus far described, Fig. 6 discloses an additional closing control circuit which is effective for closing the circuit breaker 80b, even though voltage fails to appear on one side of the circuit breaker.

To permit closure of the circuit breaker 80b when voltage appears on either side thereof, a transfer relay 147 has its energizing winding connected across a secondary of the voltage transformer 140. This transfer relay is designed to pick up and close its front contacts 148 when the voltage thereacross is in excess of about 70% of its normal value. It is designed to drop and close its back contacts 149 when the voltage falls below about 45% of its normal value. It will be noted that one terminal of each of the transformers 139 and 140 is connected to a common bus 150. The transfer relay through its front and back contacts 148 and 149, operates to connect a second bus 151 to the remaining terminal of the voltage transformer 140 if the voltage transformer is properly energized, or to the remaining terminal of the secondary winding of the voltage transformer 139 if the voltage transformer 140 is deenergized. Consequently, an operating voltage appears across the buses 150 and 151 if a voltage appears on either side of the circuit breaker 80b.

When the circuit breaker 80b is opened, a pallet switch 152 carried thereby closes its back contacts to connect the energizing winding of a timing relay 153 across the buses 150 and 151. This connection may be traced from the bus 150 through the pallet switch 152, a conductor 154, the energizing winding of the timing relay 153, the back contacts 155 of a latching relay 156, and a conductor 157 to the bus 151. Consequently, the timing relay 153 is energized when the network main on either side of the circuit breaker 80b is energized.

The timing relay 153 is designed to pick up and close its front contacts 158 when energized by a voltage in excess of approximately 90% of normal voltage with a substantial time delay, such as 12 or 13 seconds. This time delay is such that the control relays 111a and 143a will operate first to close the circuit breaker 80b if adequate voltage is present in the network main on both sides of the circuit breaker.

If voltage is present in the network main on only one side of the circuit breaker, the circuit breaker remains open until the expiration of the time delay of the timing relay 153. At the expiration of this time delay, the timing relay operates to close its front contacts 158. This establishes an energizing circuit for the closing relay 106, which may be traced from the bus 151, through the contacts 158, the energizing winding of the closing relay 106, and the back contacts 117 of the auxiliary relay 118 to the bus 150. Consequently, the closing relay operates to close the circuit breaker 80b in the customary manner. Closure of the closing relay 106 also operates to energize the auxiliary relay 118 as above pointed out, to interrupt the energizing circuit for the closing relay and to prevent further energization thereof until the auxiliary relay 118 resets.

Since the absence of voltage on one side of the sectionalizing switch may be the result of a fault, it is desirable to prevent repeated operations of the timing relay 153. To this end, front contacts 159 are provided on the timing relay for energizing the latching relay 156. This energizing circuit may be traced from the bus 151, through the conductor 157, a conductor 160, the front contacts 159, the energizing winding of the latching relay 156, back contacts 161 carried by the latching relay and a conductor 162 to the bus 150.

Actuation of the latching relay opens the energizing circuit for the timing relay 153. Actuation of the latching relay 156 also results in the engagement of a latching pin 163 with a latching lug 164 carried by the latching relay. The latching pin 163 is carried by the armature of a solenoid 165 and is biased into latching position by means of a spring 166.

From an inspection of Fig. 6, it will be noted that after one actuation of the timing relay 153, the latching relay 156 is latched to prevent further actuation of the timing relay. Consequently, if a fault is present in the network main on one side of the circuit breaker 80b, the timing relay 153 will produce one closure of the circuit breaker 80b and thereafter the circuit breaker will remain open.

If desired, the latching relay 156 may be reset manually by manually withdrawing the pin 163 from engagement with the lug 164. For completeness, however, an automatic unlatching circuit is illustrated in Fig. 6.

It will be observed that the armature of a solenoid 165 is associated with the latching pin 163. Energization of the solenoid 165 is controlled by front contacts 167 and 168 carried respectively, by the control relays 111a and 143a.

Assuming that the latching relay 156 is in latching condition, a normal operation of the control relays 111a and 143a operates to unlatch the latching relay 156. When both of the control relays 111a and 143a are actuated, the closure of the front contacts 167 and 168 completes an energizing circuit for the solenoid 165 which may be traced from the bus 151 through a conductor 169, the front contacts 168 and 167, a conductor 170, the energizing winding of the solenoid 165 and the conductor 162 to the bus 150. Energization of the solenoid 165 withdraws the latching pin 163 from engagement with the lug 164 and permits the latching relay 156 to drop to the position illustrated in Fig. 6.

Since under certain conditions, the control relay 111a may be connected to the network main on the deenergized side of the circuit breaker 80b, it follows that the back contacts 134 of this relay would not open to permit energization of the auxiliary relay 118. Energization of the auxiliary relay 118 is employed for deenergizing the closing relay 106 and the circuit for the closing coil 82. For this reason, it is desirable to provide back contacts 171 in series with the back contacts 134 for establishing a shunt circuit for the energizing winding of the auxiliary relay 118. With this modification actuation of either of the relays 111a or 153 suffices to permit energization of the auxiliary relay 118.

Although Fig. 6 illustrates the modification as applied to the closing control circuit of Fig. 5, it should be noted that the same modification may be employed with the control circuits of Fig. 3 if a phasing control is desired. The tripping circuit for the circuit breaker 80b may be similar to that illustrated in Fig. 3 for the circuit breaker 80.

Referring again to Fig. 1, assuming that the feeder circuit 1 is deenergized, and assuming further that a temporary fault occurs at the point 11, if the corner sectionalizing switches 7a are of the type disclosed in Fig. 6, these sectionalizing switches will reclose after clearance of the fault, despite the absence of voltage on the side of the switches 7a adjacent the transformer circuit breaker 1c.

Figure 7:
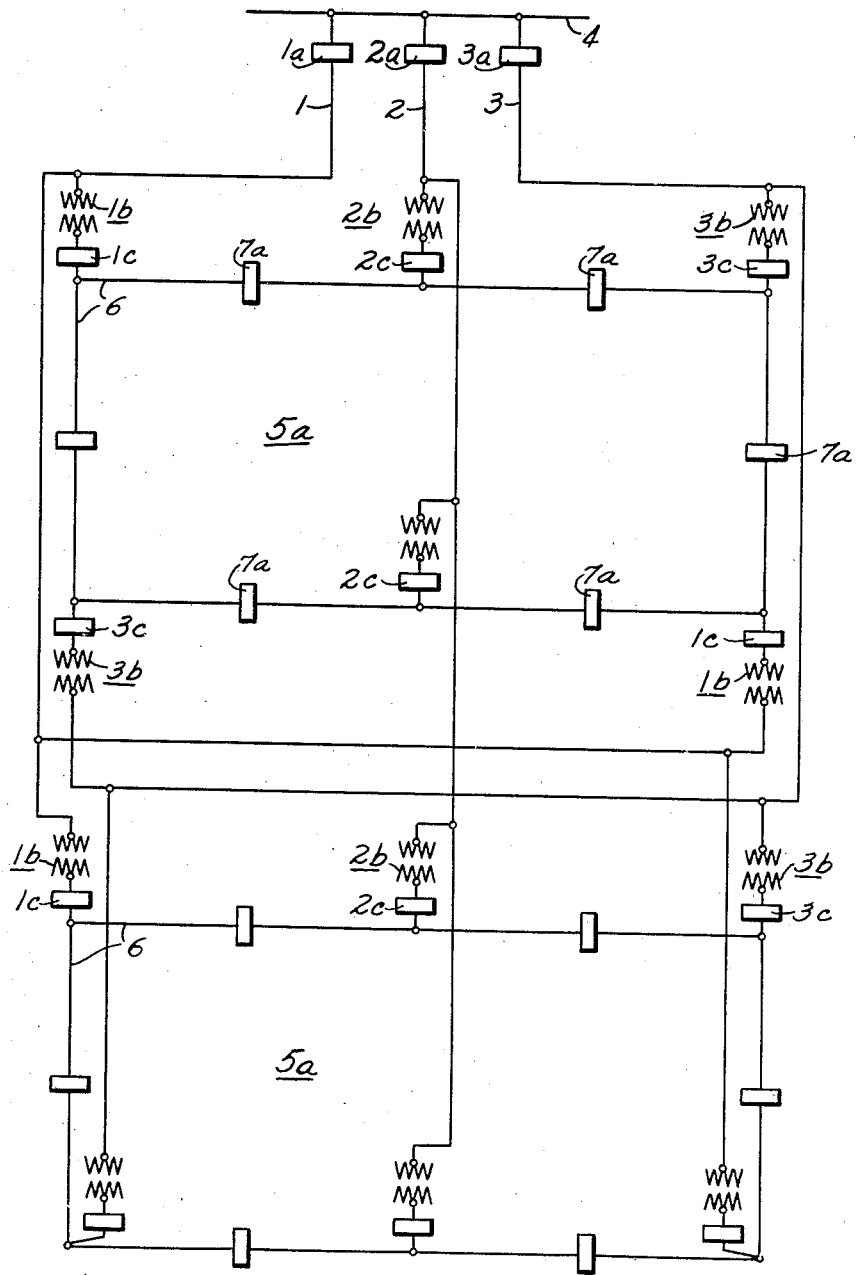
Fig. 7 is a diagrammatic single line view showing a modified primary network system embodying the invention.

Fig. 7 illustrates a modified distribution system wherein the network distribution circuits take the form of substantially independent loops. The advantages obtained from the loop construction are set forth in my copending applications Serial Nos. 342,938, and 342,940, filed June 28, 1940, and assigned to the Westinghouse Electric & Manufacturing Company. When employing the loop circuit type of network distribution circuit, it is desirable that all of the sectionalizing switches be similar to the sectionalizing switch 7a illustrated in Fig. 6. Aside from the loop form of network distribution circuit, and the construction of the switches 7a, the system illustrated in Fig. 7 is similar to that of Fig. 1.

Although the invention has been described with reference to certain specific embodiments thereof, numerous modifications are possible. Therefore, the invention is to be restricted only by the appended claims when interpreted in view of the prior art.

I claim as my invention:

1. In an electrical distribution system, a plurality of feeder circuits, a common distribution circuit interconnecting said feeder circuits for receiving energy therefrom, means responsive to current passing through a section of said distribution circuit associated with one of said feeder circuits for isolating said section from the remainder of said distribution circuit, means responsive to the condition of said one feeder circuit and said section when a fault occurs thereon for isolating said one feeder circuit from said section, means for restoring the connection of said one feeder circuit to said section, and means effective only when substantially normal voltage is present on said section for reconnecting said section to the remainder of said distribution circuit.

2. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, each of said protective means being responsive to the condition of the associated one of said feeder circuits when a fault occurs thereon for interrupting the coupling of said one feeder circuit to said network distribution system, a plurality of sectionalizing switches for sectionalizing said network mains, each adjacent pair of coupling points of said feeder circuits to said network distribution circuit having only one of said sectionalizing switches therebetween, and means responsive to current flowing through each of said sectionalizing switches for tripping the associated sectionalizing switch.

3. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, each of said protective means being responsive to current flowing therethrough to a fault occurring on said system for interrupting the coupling of the associated one of said feeder circuits to said network distribution system, a plurality of sectionalizing switches for sectionalizing said network mains, each adjacent pair of coupling points of said feeder circuits to said network distribution circuit having only one of said sectionalizing switches therebetween, and means responsive to current flowing through each of said sectionalizing switches for tripping the associated sectionalizing switch.

4. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, each of said protective means being responsive independently to the magnitude of current and to the direction of power flowing through the associated one of said feeder circuits for interrupting the coupling of said one feeder circuit to said network distribution system, a plurality of sectionalizing switches for sectionalizing said network mains, each adjacent pair of coupling points of said feeder circuit to said network distribution circuit having only one of said sectionalizing switches therebetween, and means responsive to current flowing through each of said sectionalizing switches for tripping the associated sectionalizing switch.

5. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, each of said protective means being responsive to the condition of the associated one of said feeder circuits when a fault occurs thereon for interrupting the coupling of said one feeder circuit to said network distribution system, a plurality of sectionalizing switches for sectionalizing said network mains, each adjacent pair of coupling points of said feeder circuits to said network distribution circuit having one of said sectionalizing switches therebetween, each of said sectionalizing switches comprising tripping means responsive to the magnitude of current flowing therethrough.

6. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, each of said protective means being responsive to the condition of the associated one of said feeder circuits when a fault occurs thereon for interrupting the coupling of said one feeder circuit to said network distribution system, and a plurality of sectionalizing switches for sectionalizing said network mains, each adjacent pair of coupling points of said feeder circuits to said network distribution circuit having one of said sectionalizing switches therebetween, each of said sectionalizing switches including closing means operable only in the presence of voltage on both sides thereof.

7. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, each of said protective means being responsive to the condition of the associated one of said feeder circuits when a fault occurs thereon for interrupting the coupling of said one feeder circuit to said network distribution system, and a plurality of sectionalizing switches for sectionalizing said network mains, each adjacent pair of coupling points of said feeder circuits to said network distribution circuit having one of said sectionalizing switches therebetween, each of said sectionalizing switches comprising tripping means responsive with inverse time delay to the magnitude of current flowing therethrough.

8. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, each of said protective means being responsive to the condition of the associated one of said feeder circuits when a fault occurs thereon for interrupting the coupling of said one feeder circuit to said network distribution system, and a plurality of sectionalizing switches for sectionalizing said network mains, each adjacent pair of coupling points of said feeder circuits to said network distribution circuit having one of said sectionalizing switches therebetween, each of said sectionalizing switches comprising tripping means responsive with inverse time delay to the magnitude of current flowing therethrough, and closing means for each of said sectionalizing switches, each of said closing means being effective for closing the associated sectionalizing switch only when voltage is present on the associated main on both sides of said sectionalizing switch.

9. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, a plurality of sectionalizing switches positioned in said network mains between points of connection thereof for sectionalizing said network mains, and closing means for each of said sectionalizing switches, each of said closing means being effective only when the phase conditions across the poles of the associated sectionalizing switch are correct.

10. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, a plurality of sectionalizing switches positioned in said network mains between points of connection thereof for sectionalizing said network mains, first closing means for said protective means, and second closing means for said sectionalizing switches, the second closing means of the sectionalizing switches adjacent an open protective means being effective only after closure of said open protective means.

11. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, tripping means for said protective means, said tripping means including means responsive with relatively little time delay to the direction of current flow through the associated protective means and said tripping means including means responsive with substantial time delay to the magnitude of current flow through the associated protective means for tripping said protective means, and sectionalizing means for sectionalizing said network mains between points of connection thereto of said feeder circuits.

12. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, tripping means for said protective means, said tripping means including means responsive with relatively little time delay to the direction of current flow through the associated protective means and said tripping means including means responsive with substantial time delay to the magnitude of current flow through the associated protective means for tripping said protective means, and sectionalizing means for sectionalizing said network mains between points of connection thereto of said feeder circuits, each of said sectionalizing means comprising current responsive tripping means, and closing means operable only when substantial voltage is present in the associated network main on both sides of the tripped sectionalizing means.

13. In an electrical distribution system, a plurality of feeder circuits, a plurality of substantially independent distribution loop circuits, means for coupling each of said feeder circuits to each of said loop circuits at a plurality of points, the points of connection of said feeder circuits to each of said loop circuits alternating uniformly around said loop circuits, current responsive means for interrupting the coupling of each of said feeder circuits to said loop circuits, sectionalizing means between each adjacent pair of said points of connection for sectionalizing said loop circuits, means responsive to current flowing through each of said sectionalizing means for tripping the associated sectionalizing means, and means for closing each one of said sectionalizing means effective only when substantial voltage appears on both sides of said one of said sectionalizing switches, said loop circuits being electrically connected to each other only through said feeder circuits.

14. In a polyphase electrical distribution system having a first polyphase portion and a second polyphase portion, a sectionalizing switch for coupling said portions, means for tripping said switch, means for closing said switch, and means for controlling said closing means comprising means for deriving from said first portion a first quantity dependent on a phase sequence voltage component of the energization thereof, means for deriving from said second portion a second quantity dependent on a voltage component of the energization thereof of the same phase sequence as said first-named component, and control means effective for permitting operation of said closing means only when said first quantity, said second quantity and a resultant of said first and second quantities all are within predetermined ranges.

15. In an electrical distribution system, means for sectionalizing portions of said system including a sectionalizing switch, means for tripping said sectionalizing switch, means for closing said sectionalizing switch, said closing means being effective for a closing operation only when substantial voltage is present in said system on both sides of said sectionalizing switch, means for conditioning said closing means for operation when a voltage is present in said system on either side of said sectionalizing switch, and means restricting said conditioning means to only a restricted number of immediately consecutive operations of said closing means.

16. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, each of said protective means being responsive to the condition of the associated one of said feeder circuits when a fault occurs thereon for interrupting the coupling of said one feeder circuit to said network distribution system, and a plurality of sectionalizing switches for sectionalizing said network mains, each adjacent pair of coupling points of said feeder circuits to said network distribution circuit having one of said sectionalizing switches therebetween, each of said sectionalizing switches including closing means operable only in the presence of voltage on both sides thereof, certain of said sectionalizing switches also including means conditioning the associated closing means for a restricted number of immediately consecutive operations in response to the presence of voltage on either side of said certain of said sectionalizing switches.

17. In a polyphase electrical distribution system having a first polyphase portion and a second polyphase portion, a sectionalizing switch for coupling said portions, means for tripping said switch, means for closing said switch, and means for controlling said closing means comprising means for deriving from said first portion a first quantity dependent on the positive phase sequence voltage component of the energization thereof, means for deriving from said second portion a second quantity dependent on the positive phase sequence voltage component of the energization thereof, control means effective for permitting operation of said closing means only when said first quantity and said second quantity are above predetermined values, and means responsive to the vector difference between said quantities for preventing operation of said closing means.

18. In an electrical distribution system, means for sectionalizing portions of said system including a sectionalizing switch, means for tripping said sectionalizing switch, means for closing said sectionalizing switch, and control means for controlling the operation of said closing means, said control means including first means effective only when substantial voltage is present in said system on both sides of said sectionalizing switch for operating said closing means, and second means effective when voltage is present in said system on one side of said sectionalizing switch for operating said closing means, one of said first and second means being designed to control said closing only if the other of said first and second means fails to initiate a closure of said sectionalizing switch within a predetermined time.

19. In an electrical distribution system, means for sectionalizing portions of said system including a sectionalizing switch, means for tripping said sectionalizing switch, means for closing said sectionalizing switch, and control means for controlling the operation of said closing means, said control means including first means effective only when substantial voltage is present in said system on both sides of said sectionalizing switch for operating said closing means, second means effective when voltage is present in said system on either side of said sectionalizing switch for operating said closing means, said second means having a delay in operation sufficient to permit prior operation of said first means if voltage is present in said system on both sides of said sectionalizing switch, and lock-out means for rendering said second means inoperative after a predetermined operation thereof.

20. In an electrical distribution system, means for sectionalizing portions of said system including a sectionalizing switch, means for tripping said sectionalizing switch, means for closing said sectionalizing switch, and control means for controlling the operation of said closing means, said control means including first means effective only when substantial voltage is present in said system on both sides of said sectionalizing switch for operating said closing means, second means effective when voltage is present in said system on either side of said sectionalizing switch for operating said closing means, said second means having a delay in operation sufficient to permit prior operation of said first means if voltage is present in said system on both sides of said sectionalizing switch, lock-out means for rendering said second means inoperative after a predetermined operation thereof, and means responsive to the presence of voltage in said system on both sides of said sectionalizing switch for restoring said second means for further operation following an operation of said lock-out means.

21. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, each of said protective means being responsive to current flowing therethrough for interrupting the coupling of said one feeder circuit to said network distribution system, and a plurality of current responsive sectionalizing switches for sectionalizing said network mains, each adjacent pair of coupling points of said feeder circuits to said network distribution circuit having one of said sectionalizing switches therebetween, each of said sectionalizing switches including closing means operable only in the presence of voltage on both sides thereof.

22. In an electrical distribution system, a network distribution circuit having a plurality of connected network mains, a plurality of feeder circuits for supplying electrical energy to said network distribution circuit, a plurality of transformer means for coupling said feeder circuits to said network distribution circuit, protective means associated with each of said transformer means for controlling the coupling of said feeder circuits to said network distribution circuit through said transformer means, each of said protective means being responsive to current flowing therethrough for interrupting the coupling of said one feeder circuit to said network distribution system, and a plurality of current responsive sectionalizing switches for sectionalizing said network mains, each adjacent pair of coupling points of said feeder circuits to said network distribution circuit having one of said sectionalizing switches therebetween, each of said sectionalizing switches including closing means, first means effective for operating said closing means only when substantial voltage is present in said system on both sides of the associated sectionalizing switch, and second means effective for operating said closing means when voltage is present in said system on either side of the associated sectionalizing switch, said second means being operable only after a delay sufficient to permit prior operation of said first means if voltage is present in said system on both sides of said sectionalizing switch.

JOHN S. PARSONS.